(12) United States Patent
Takahashi (10) Patent No.: US 8,547,508 B2
(45) Date of Patent: Oct. 1, 2013

(54) LIQUID CRYSTAL DISPLAY DEVICE WITH AN ANISOTROPICALLY REFLECTING LAYER AND MANUFACTURING METHOD FOR THE SAME

(75) Inventor: Satoru Takahashi, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 1932 days.

(21) Appl. No.: 11/667,364

(22) PCT Filed: Dec. 11, 2003

(86) PCT No.: PCT/IB03/05955
§ 371 (c)(1),
(2), (4) Date: Oct. 4, 2010

(87) PCT Pub. No.: WO2004/055582
PCT Pub. Date: Jul. 1, 2004

(65) Prior Publication Data
US 2011/0013127 A1    Jan. 20, 2011

(30) Foreign Application Priority Data

Dec. 17, 2002  (JP) ................................. 2002-365149

(51) Int. Cl.
*G02F 1/1335* (2006.01)
(52) U.S. Cl.
USPC ........................................................ 349/113

(58) Field of Classification Search
None
See application file for complete search history.

(56) References Cited

U.S. PATENT DOCUMENTS

| | | | |
|---|---|---|---|
| 2001/0007489 A1* | 7/2001 | Umemoto et al. | 349/113 |
| 2002/0003596 A1 | 1/2002 | Kim | |
| 2002/0047966 A1* | 4/2002 | Fujino | 349/113 |
| 2002/0113927 A1 | 8/2002 | Ha et al. | |
| 2003/0117551 A1 | 6/2003 | Fujimori et al. | |
| 2003/0160914 A1 | 8/2003 | Ha | |

FOREIGN PATENT DOCUMENTS

| | | |
|---|---|---|
| JP | 4-243226 | 8/1992 |
| JP | 10-177106 | 6/1998 |
| JP | 177106 | 6/1998 |
| JP | 2000 105366 | 4/2000 |

\* cited by examiner

*Primary Examiner* — Tina Wong
(74) *Attorney, Agent, or Firm* — Birch, Stewart, Kolasch & Birch, LLP (57) ABSTRACT

A liquid crystal display device comprises an optically diffusively reflecting layer arranged to maximize utilization of incident light. The reflecting layer contains a thin metallic film with projections (14a) each having an unsymmetrical cross section to centralise reflected light in a specific azimuth direction (y). The range of viewing angles ($\theta_{x-z}$, $\theta_{y-z}$) into which a substantial portion of the incident light is reflected is broader in the specific azimuth direction (y) than in another direction (x). The director (5d) of liquid crystal molecules initiallly lies in a plane (y-z) parallel to the specific azimuth direction (y) to achieve retardation self-compensation.

5 Claims, 7 Drawing Sheets

LIQUID CRYSTAL DISPLAY DEVICE WITH AN ANISOTROPICALLY REFLECTING LAYER AND MANUFACTURING METHOD FOR THE SAME

BACKGROUND OF THE INVENTION

1. Field of the Invention

The present invention relates to a reflective or transflective liquid crystal display device and its manufacturing method. The invention especially relates to a liquid crystal display device having a diffusive reflecting layer providing distribution of diffused reflected light with a specific directivity.

2. Description of the Related Art

Prior to now, there has been a reflective liquid crystal display device provided with a liquid crystal layer for performing optical modulation in accordance with an image to be displayed and a diffusive reflecting layer disposed on the back side opposite to the display face is conventionally available. Such a display device causes light, which has been incident from the front side of the display device and has passed through the liquid crystal layer, to be diffusively reflected by the diffusive reflecting layer and returned to the display face side through the liquid crystal layer again, whereby image displaying is performed using the light modulated by the liquid crystal layer.

The diffusive reflecting layer used here is intended to prevent the external light incident from the display face side of the display device from regularly reflecting and mirror-reflecting the image on the external light side and allow the displayed image to be fully visually recognized even if the user changes a viewing angle to some extent.

As a reflective liquid crystal display device used for a portable information terminal or the like, there is known a kid of device arranged to intentionally differentiate a diffused reflected light distribution in the case where the screen is viewed from the front at different angles in the vertical direction from a diffused reflected light distribution in the case where the screen is viewed from the front at different angles in the horizontal direction in an attempt to make efficient use of light adapted to the mode of use in the portable information terminal or the like (see Patent Document 1, for instance).

[Patent Document 1]

Japanese Patent Application Laid-Open No. 177106/98 (paragraph number 0128 of the 11th page to paragraph number 0130 of the 12th page, FIGS. 27, 28, 51 and 52)

However, such a liquid crystal display device with a diffused reflected light distribution having a predetermined directivity is not intended to improve a quality of displaying by maximizing the utilization of the directivity in addition to effective use of light, which is achieved by adaptation for the above-described mode of use.

SUMMARY OF THE INVENTION

The present invention has been implemented in view of the above-described problem and its object is to provide a liquid crystal display device which maximizes the utilization of the directivity of the diffused reflected light distribution of the diffusive reflecting layer and can further improve a quality of displaying.

It is another object of the present invention to achieve efficient improvement of contrast characteristics, which is suitable to a liquid crystal display device comprising a diffusive reflecting layer having diffused reflected light distribution with a directivity.

In order to achieve these objects, an aspect of the present invention is a liquid crystal display device comprising a liquid crystal layer for performing optical modulation in accordance with an image to be displayed and a diffusive reflecting layer for diffusively reflecting light having passed through the liquid crystal layer to the liquid crystal layer with a diffused reflected light distribution having a predetermined directivity, wherein—the diffusive reflecting layer has a function of giving the reflected light a diffused reflected light distribution in which: a first range of viewing angles within which reflected light rays of luminous flux of predetermined proportion of the first total luminous flux of reflection are obtained is defined, the first total luminous flux being obtained in a specific plane including an imaginary axis of a specific direction along a principal plane of the diffusive reflecting layer and the normal to the principal plane by incident light in a direction parallel to the normal, the first range of viewing angles having the direction of the incident light as a reference angle; a second range of viewing angles within which reflected light rays of luminous flux of the predetermined proportion of the second total luminous flux of reflection are obtained is defined, the second total luminous flux being obtained by the incident light in the other plane including an imaginary axis of the other direction along the principal plane of the diffusive reflecting layer and the normal to the principal plane, the second range of viewing angles having the direction of the incident light as a reference angle; and the first range is narrower than the second range,—an initial average orientation imaginary plane of the liquid crystal layer, including a typical director of liquid crystal molecules in a dark or bright state and the normal to the principal plane of the diffusive reflecting layer, is substantially parallel to the specific plane.

This gives substantially constant retardation independent of viewing angles to the reflected light in the direction along the specific plane, which behaves like direct reflection, and thereby it is possible to reduce dependence of contrast on the viewing angle in the direction along the specific plane. Therefore, it is possible to provide the brightest possible image display with high visibility even in the direction along the specific plane.

For this aspect, there may be provided an orientation film for determining such an initial molecular orientation of the liquid crystal layer that the initial average orientation imaginary plane is set to be substantially parallel to the specific plane.

In this aspect, the specific direction and the other direction may have a substantially perpendicular relations. This allows the liquid crystal display device having diffused reflected light distribution with a directivity in directions perpendicular to each other to be further improved in respect of a quality of displaying. Setting the specific direction in particular to the vertical direction of the display face of the liquid crystal display device and setting the other direction to the horizontal direction of the display face is suitable for the liquid crystal display device used in portable devices. Since a display face of this type of display device is overwhelmingly more often viewed by changing the viewing angle horizontally than it is viewed by changing the viewing angle vertically, the ability to maintain a bright image when the viewing angle is changed horizontally is very effective and at the same time assures stability of contrast also when the viewing angle is changed vertically.

In the liquid crystal display device, the diffusive reflecting layer may have a reflecting surface showing roughness of shape based on a plurality of island-shaped outline units of depression or projection portions, and an average diameter of the units of depression or projection portions in the specific direction may be greater than an average diameter in a direction substantially perpendicular to the specific direction on the principal plane of the diffusive reflecting layer, and alternatively, an average pitch of the units of depression portions or the units of projection portions in the specific direction may be greater than an average pitch of them in a direction substantially perpendicular to the specific direction on the principal plane of the diffusive reflecting layer. This has advantages that a desired directivity can be added to the diffused reflected light distribution of the diffusive reflecting layer relatively simply and in sophistication.

The liquid crystal display device according to the above-mentioned forms can be manufactured using a method of manufacturing a liquid crystal display device comprising a liquid crystal layer for performing optical modulation in accordance with an image to be displayed and a diffusive reflecting layer for diffusively, reflecting light having passed through the liquid crystal layer to the liquid crystal layer with a diffused reflected light distribution having a predetermined directivity, comprising the steps of forming the diffusive reflecting layer in such a form that the diffusive reflecting layer has a function of giving the reflected light a diffused reflected light distribution in which: a first range of viewing angles within which reflected light rays of luminous flux of a predetermined proportion of the total luminous flux of reflection are obtained is defined, the total luminous flux being obtained in a specific plane including an imaginary axis of a specific direction along a principal plane of the diffusive reflecting layer and the normal to the principal plane by incident light in a direction parallel to the normal, the first range of viewing angles having the direction of the incident light as a reference angle; a second range of viewing angles within which reflected light rays of luminous flux of the predetermined proportion of the total luminous flux of reflection are obtained is defined, the total luminous flux being obtained by the incident light in the other plane including an imaginary axis of the other direction along the principal plane of the diffusive reflecting layer and the normal to the principal plane, the second range of viewing angles having the direction of the incident light as a reference angle; and the first range is narrower than the second range, forming an orientation film for determining an initial molecular orientation of the liquid crystal layer, in such a manner that an initial average orientation imaginary plane of the liquid crystal layer, including a typical director of liquid crystal molecules in a dark or bright state and the normal to the principal plane of the diffusive reflecting layer, is substantially parallel to the specific plane.

DESCRIPTION OF THE PREFERRED EMBODIMENT(S)

With reference to the attached drawings, the above aspects and other aspects of the present invention will be described based on embodiments in more detail below.

First, the diffusive reflecting layer used in embodiments of the present invention will be explained.

Figure 1:
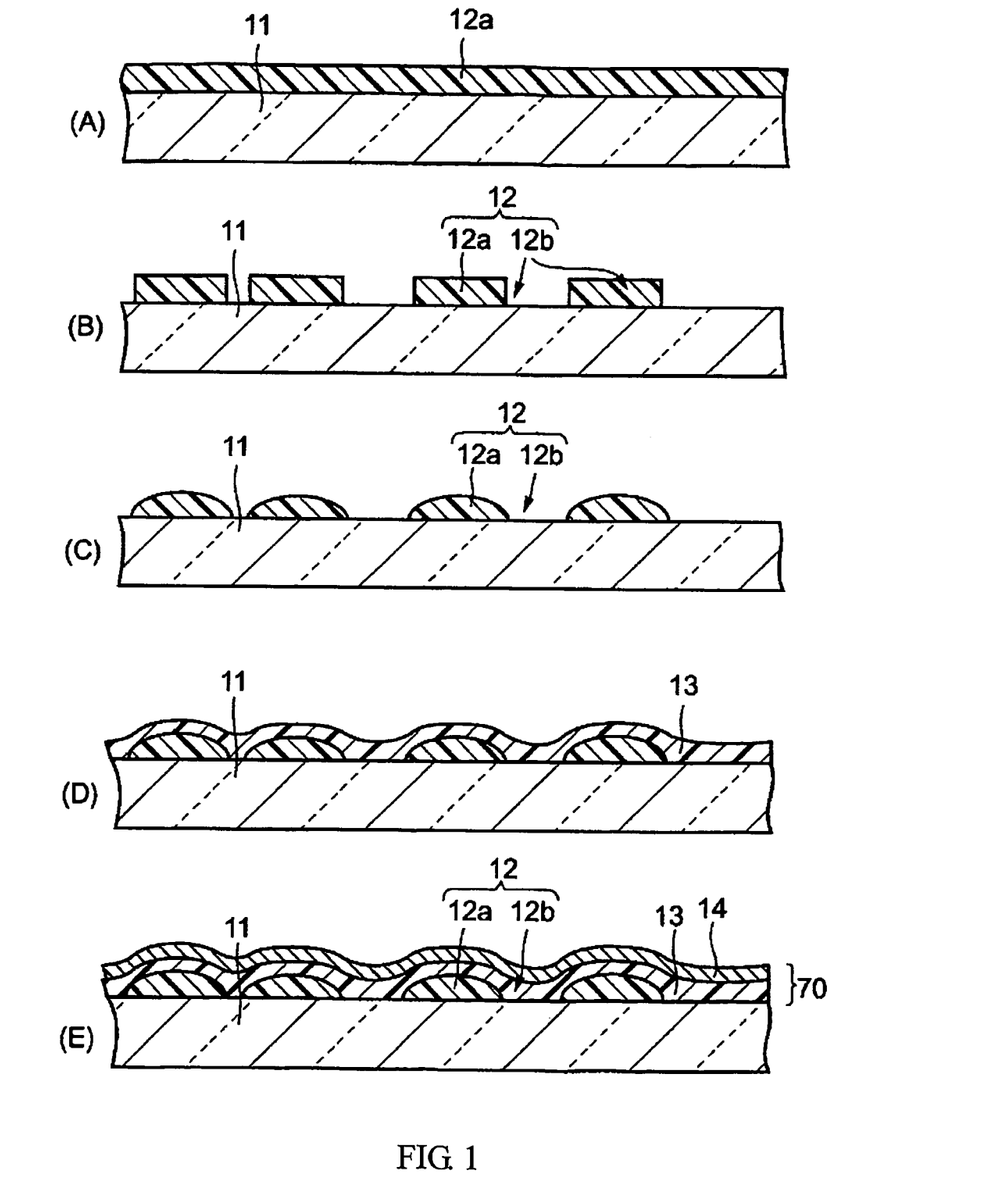
FIG. 1 is a sectional view schematically showing a structure of a diffusive reflecting layer forming member in the respective steps of a manufacturing method for a diffusive reflecting layer applied to the present invention.

FIG. 1 shows a sectional structure of a member forming the diffusive reflecting layer in the respective steps of a manufacturing method for a diffusive reflecting layer.

In a first step (A), a support member 11 made of glass, for example, is prepared and a photoresist material of e.g. negative type is applied to the entire surface of this support member 11 to a thickness of 2 µm to form a resist film 12a. Then, after conducting prebaking, the resist film 12a is exposed to light using a photomask.

Figure 2:
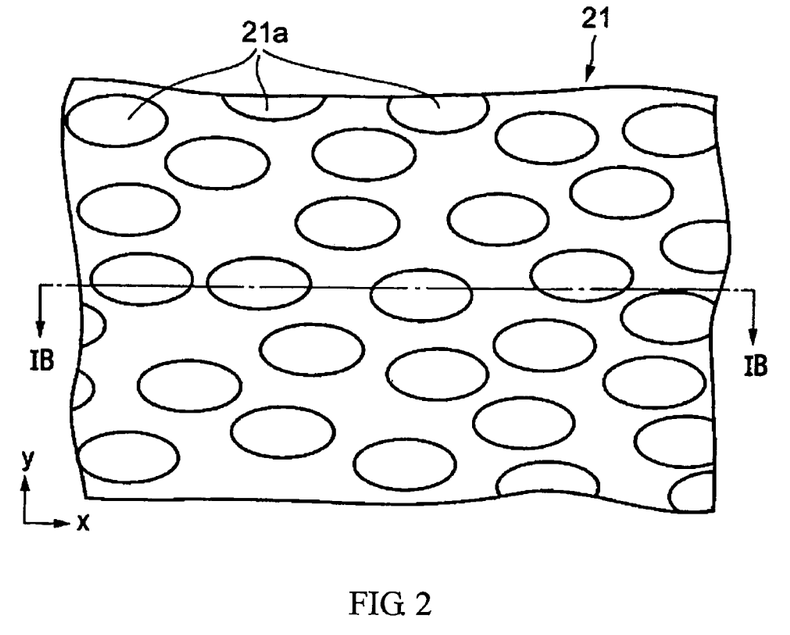
FIG. 2 is a plan view schematically showing an example of photomask used in the manufacturing method of FIG. 1.

FIG. 2 is a plan view schematically showing an example of photomask used for such exposure.

This mask has a plurality of openings 21a arranged away from one another and these openings 21a have an elliptic shape with a major axis of 6 to 14 µm and a minor axis of 3 to 7 µm, for example. In this embodiment, the sizes of the openings 21a may be the same or different from one another, but the openings 21a have substantially the same major axis direction and the same minor axis direction.

An average length of the major axis (average diameter) is, for example, 10 µm and an average length of the minor axis (average diameter) is, for example, 5 µm. Furthermore, for the later-described reasons, these openings 21a have a pitch in the major axis direction (x-direction in FIG. 2) longer than a pitch in the minor axis direction (y-direction in FIG. 2) That is, the openings 21a are provided more densely in the minor axis direction.

Figure 3:
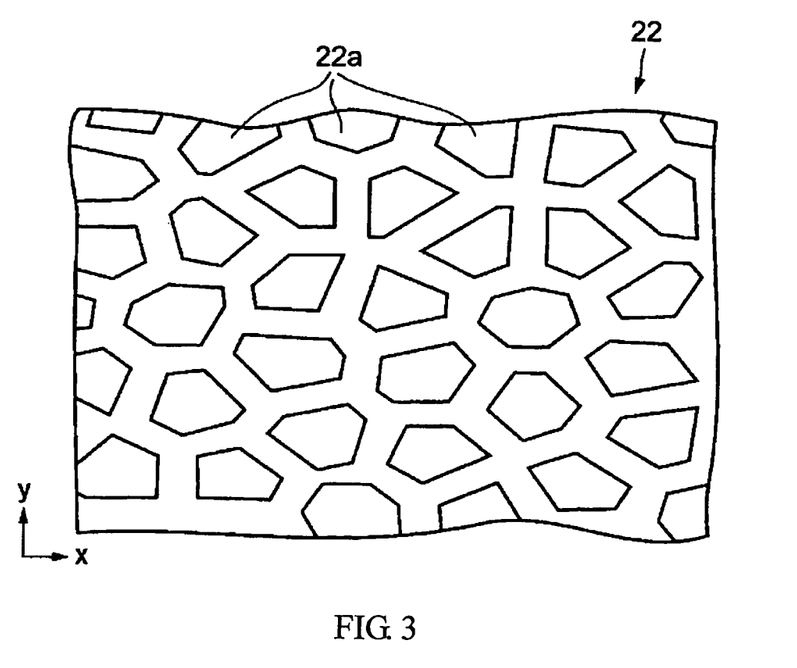
FIG. 3 is a plan view schematically showing another example of photomask used in the manufacturing method of FIG. 1.

Besides the above-mentioned described mask 21, for example as shown in FIG. 3, it is also possible to use a mask 22 having polygonal openings 22a whose average diameter in the x-direction is different from the average diameter in the y-direction. It is also possible to use a mask having a mixture of elliptic openings and polygonal openings. In short, the photomask in this embodiment has openings with the average diameter in the x-direction being greater than the average diameter in the y-direction perpendicular to the x-direction and with a pitch in the x-direction being greater than a pitch in the y-direction.

Using the elliptic opening mask 21 has an advantage of being able to have a relatively simple structure. On the other hand, using the polygonal opening mask 22 is preferable in that it facilitates the control over angles of inclination of the surface of the reflecting film (see (E) in FIG. 1) which will be described later and allows the density of the polygonal openings to be greater than that of the elliptic openings.

It is noted that the average diameter in the x-direction of openings is, for example, 1.5 to 2 times the average diameter in the y-direction and the pitch in the x-direction of openings is, for example, 1.5 to 2 times the pitch in the y-direction. In this way, the ratio of average diameters in the x-direction to the y-direction is preferably the same as the ratio of pitches in the x-direction to the y-direction.

In the next step (B), development is performed. In this way, the resist film 12a is selectively left in correspondence with the openings of the mask (portions other than the residual portions are dissolved and removed) to form a plurality of depression portions 12b, whereby a projections and depressions layer 12 made up of the residual resist film 12a and the plurality of depression portions 12b is formed. The projection portions 12a correspond to the openings of the mask as described above, and therefore the average diameter of the portions 12a in the x-direction (horizontal direction in FIG. 1) is greater than the average diameter of the same in the y-direction (direction perpendicular to the surface of the sheet in FIG. 1) and the pitch thereof in the x-direction is greater than the pitch thereof in the y-direction. (B) in FIG. 1 indicates a sectional view taken along a line IB-IB in FIG. 2.

Furthermore, in the next step (C), post-baking is conducted at a temperature of, for example, 200° C. or above. This smoothens edges of the top face of the resist film 12a and opening ends of the depression portions 12b. This post-baking may cause the average diameters of the projection portions 12a in the above-described x-direction and y-direction (diameters on the interface with the support member 11) to change slightly but they are considered substantially the same.

After such post-baking, the process moves on to a step (D) in which a photoresist is applied to the entire surface of the support member 11 so as to cover the projections and depressions layer 12 with the photoresist under an application condition, for example, of a thickness of 1 μm to form a projections and depressions adjusting layer 13 having roughness of shape according to the projections and depressions layer 12. This projections and depressions adjusting layer 13 is intended to finally adjust roughness of shape of the reflecting film 14 (see (E) in FIG. 1) which will be described later. More specifically, the projections and depressions adjusting layer 13 is formed in such a way that the maximum angles of inclination of the surface of the reflecting film 14 has a desired value and the angles of inclination of the surface of the reflecting film in the area corresponding to the depression portions 12b of the projections and depressions layer 12 is also changed to desired angles to make the reflecting film 14 undulate as a whole.

Then, in a step (E), a metallic material such as aluminum or silver is sputtered onto the entire surface of the projections and depressions adjusting layer 13 to form the reflecting film 14 having a thickness of 100 nm or more with projections and depressions (or with a roughened surface) by the projections and depressions layer 12 (and projections and depressions adjusting layer 13). This results in formation of a composite layer 70 (referred to as "diffusive reflecting layer" in the present specification and it is a generic name also for other examples of diffusive reflecting layers) provided with the projections and depressions layer 12, projections and depressions adjusting layer 13 and reflecting film 14 on one side of the support member 11. The reflecting film 14 extends along the undulations formed of the projections and depressions layer 12 and projections and depressions adjusting layer 13, and therefore the undulations of the surface of the reflecting film (reflecting surface) are also sparse in the x-direction and dense in the y-direction.

Figure 4:
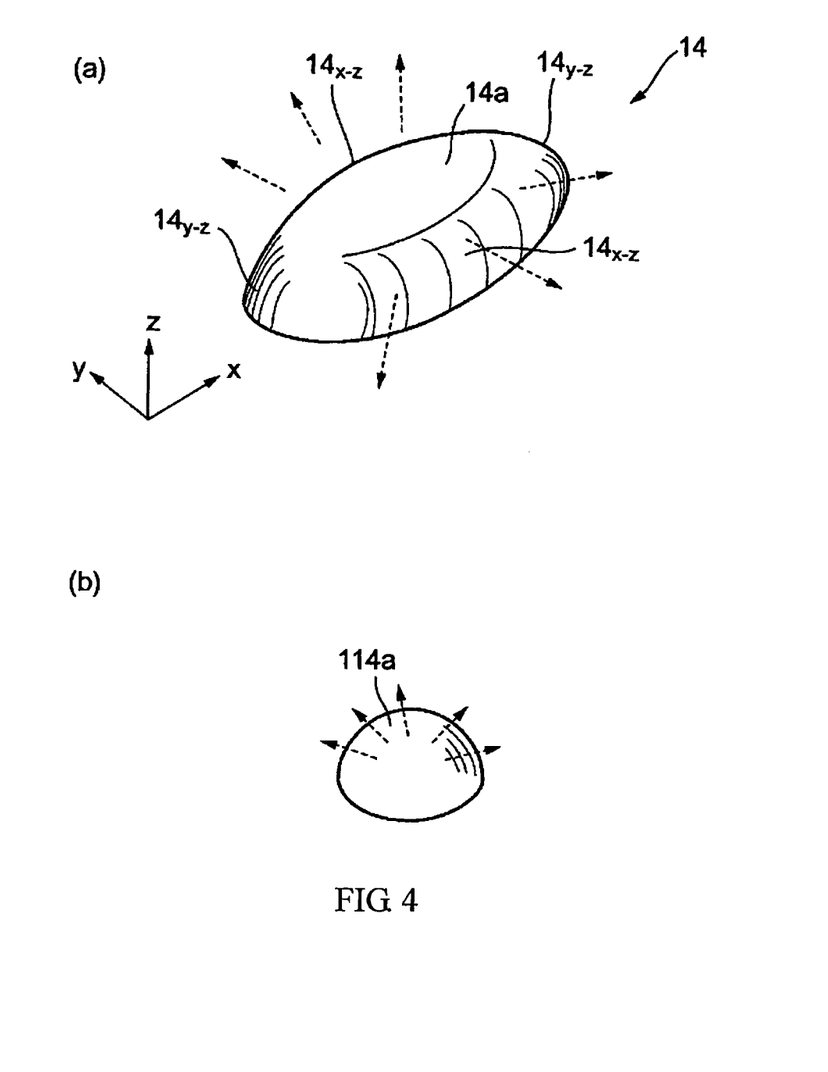
FIG. 4 is an enlarged perspective view schematically showing outlines of the respective parts of a reflecting film of a diffusive reflecting layer of FIG. 1 and a reflecting film of a comparison example thereto.

FIG. 4 shows an example (a) of the projection portion of the reflecting film 14 and a comparative example (b) thereof.

In the example (a), a projection portion 14a having an island-shaped outline of the surface of the reflecting film 14 extends relatively long in the x-direction and the pitch of the projection portion in the x-direction is greater than the pitch in the y-direction. Thus, as a whole, a slope $14_{x\text{-}z}$ which is inclined with respect to the x-z plane has a greater area than a slope $14_{y\text{-}z}$ which is inclined with respect to the y-z plane. Here, z denotes a front-view direction of the entire reflecting film 14, in other words, the lamination direction of the reflecting film 14. "Pitch" here refers to the distance between the centers of adjacent projections.

In this way, light incident on the reflecting film 14 is reflected more dominantly in the direction along the y-z plane as shown with dotted arrows in (a) of FIG. 4 and is likely to be reflected at various angles as a whole. On the contrary, light reflected in the direction along the x-z plane is relatively scarce. Therefore, the light is reflected at a wider range of angles in the direction along the y-z plane, while it is reflected at a narrower range of angles in the direction along the x-z plane, resulting in a diffused reflected light distribution having a directivity.

On the other hand, in the example (b), the projection portion of the reflecting film 114 is symmetric with respect to the center (circular when viewed in the z-direction in this figure) and when the pitches of the projection portions in the x-direction and y-direction are the same, light is diffusively reflected uniformly in all directions as a whole.

Thus, the reflecting film 14 according to this embodiment having the projection portions in the figure (a) whose pitches differ in the x-direction and y-direction can provide the reflected light with a directivity as a whole.

Figure 5:
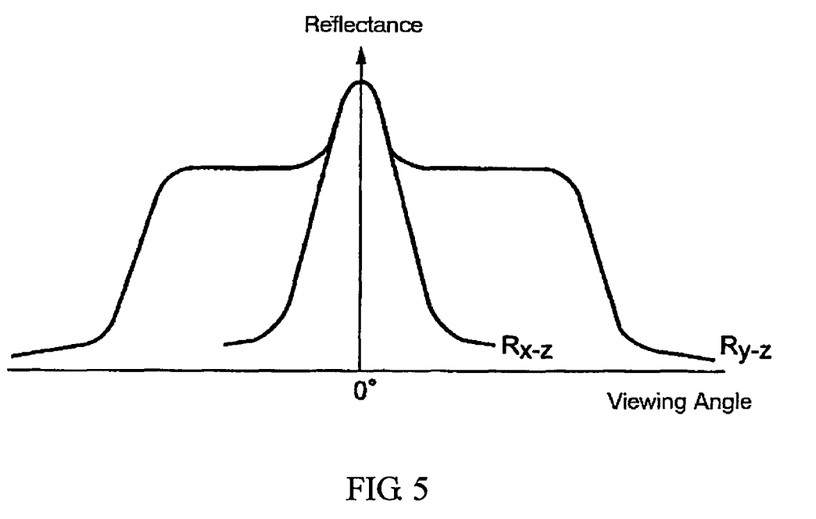
FIG. 5 is a graph showing a diffused reflected light distribution of a diffusive reflecting layer of FIG. 1.

FIG. 5 is a graph showing such a directivity and shows an example of the case where light rays having certain constant intensity is incident onto the reflecting film 14 from the front side.

A curve $R_{x\text{-}z}$ denotes a reflectance with respect to the viewing angles on the x-z plane, while a curve $R_{y\text{-}z}$ denotes a reflectance with respect to the viewing angles on the y-z plane. The viewing angle 0° denotes a front view angle, that is, an angle when the reflecting film 14 is viewed from the front side.

It is appreciated from these curves that reflected light of considerably strong intensity is obtained only in a certain range of viewing angles near 0° on the x-z plane, while the intensity of the reflected light drops drastically when the reflected light goes away from that range. In the case of the y-z plane, it is appreciated that reflected light of considerably strong intensity is obtained not only in the vicinity of 0° but also in a remarkably wide range of viewing angles centered at 0° is obtained and its viewing angle characteristic is quite different from that of the x-z plane.

Figure 6:
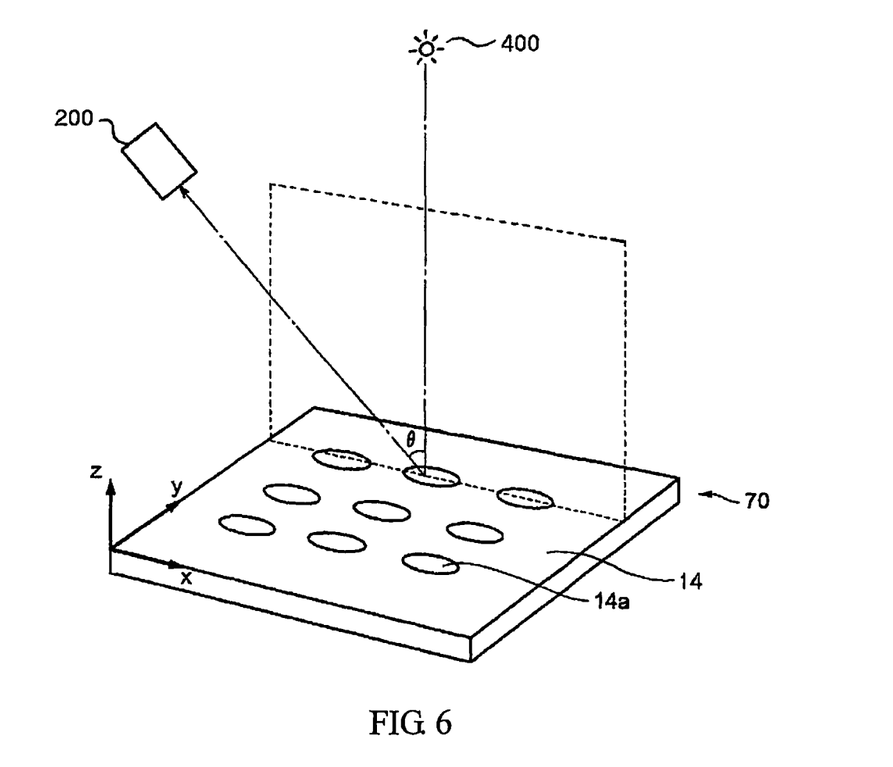
FIG. 6 is a schematic view of a measuring form for obtaining the graph of FIG. 5.

More specifically, the graph having the diffused reflected light distribution as shown in FIG. 5 is obtained, as shown in FIG. 6, by placing a light source 400 right above the diffusive reflecting layer 70, making a ray of light incident onto the reflecting film 14 in the z-direction which is parallel to the normal to the principal plane of the diffusive reflecting layer and measuring the intensity of the reflected light within the plane of incidence of the incident light by means of optical detector 200 while changing a value of an angle θ formed by the reflected light and the normal of incidence within the plane of incidence. Basically, the ratio of the intensity of the reflected light to the intensity of the incident light used here can be regarded as the reflectance of the vertical axis shown in FIG. 5 and the angle θ can be regarded as the viewing angle of the horizontal axis. FIG. 6 shows a mode of measuring the viewing angle characteristic in the direction parallel to the x-z plane, but the same measuring way is also applicable to the direction parallel to the y-z plane.

Here, when the reflectance obtained is expressed by R(θ) that is a function of θ,

[Numerical Formula 1]

$$\int_{-90°}^{+90°} R(\theta)d\theta \quad (1)$$

is an expression from which the total sum of the reflectance within the plane of incidence is derived. The value of such a total sum can be regarded as equivalent to the total luminous flux of reflection within the plane of incidence, provided that the incident light is constant.

From FIG. 5 it is appreciated that the fact that the reflectance is high in the vicinity of viewing angle 0° is commonly applicable to both the curve $R_{x-z}$ and curve $R_{y-z}$, but the actual curves may be more complicated curves or slightly asymmetric curves, and to deal with such cases, it is desirable to define a range of viewing angles that satisfies certain conditions using the following equation.

[Numerical Formula 2]

$$\int_{-\phi}^{+\phi} R(\theta)d\theta = K \int_{-90°}^{+90°} R(\theta)d\theta \quad (2)$$

$$(0 < K < 1)$$

Here, the right side is the product of Formula (1) multiplied by a predetermined coefficient K, which is equivalent to a value corresponding to a certain proportion (K) of the total sum of the reflectance within the plane of incidence, and if the incident light is constant, it is considered equivalent to luminous flux of that proportion of the total luminous flux of reflection within the plane of incidence. The left side is the total sum of the reflectance within the plane of incidence when the value of θ is changed from −φ to +φ for satisfying a value according to the proportion of this right side. The right side is a constant and the left side is a function whose variable is φ. Thus, the value of φ is obtained and this value indicates the range of viewing angles from which the luminous flux corresponding to the proportion of the total luminous flux of reflection within the plane of incidence is obtained.

More practicably,

[Numerical Formula 3]

$$\int_{-\phi}^{+\phi} R(\theta)d\theta = 0.5 \int_{-80°}^{+80°} R(\theta)d\theta \quad (3)$$

is used.

The reason that the range of θ in the right side is set to −80° to +80° is that this range is a range in which a detector 200 is believed to be able to easily measure the intensity of reflected light and the measurement will become actually difficult beyond this range.

Figure 7:
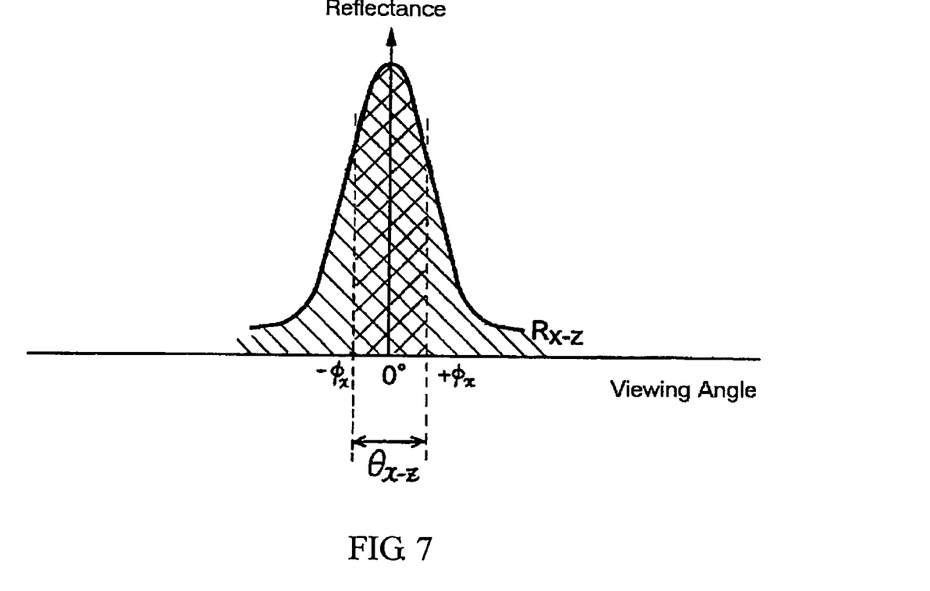
FIG. 7 is a graph showing a characteristic of view angles versus reflectance for explaining a range of viewing angles in one specific plane of the diffusive reflecting layer of FIG. 1.
Figure 8:
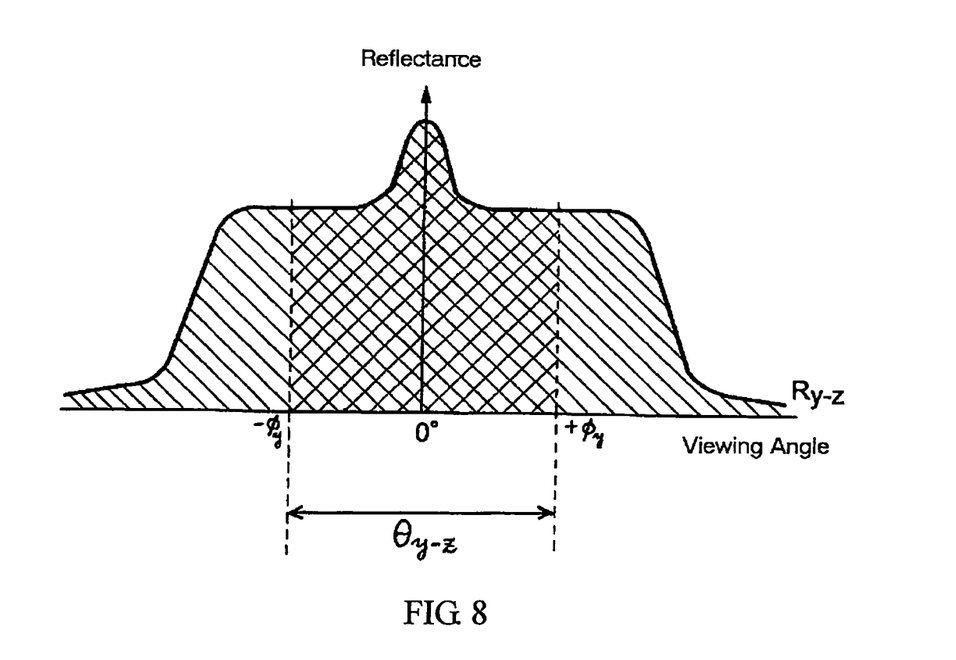
FIG. 8 is a graph showing a characteristic of view angles versus reflectance for explaining a range of viewing angles in another specific plane of the diffusive reflecting layer of FIG. 1.

As in Formula (3), it is possible to use 0.5 as the value of proportion K in practice. This indicates half areas of the total areas (areas with single hatching and cross hatching) of the domains enclosed by the curve $R_{x-z}$ and curve $R_{y-z}$ and the horizontal axis as shown in FIGS. 7 and 8. In this example, the center (reference angle or front view angle) of the range of viewing angles which defines the half area is set to the direction of the incident light (0°). Therefore, the half areas occupy the areas with cross hatching in FIGS. 7 and 8, respectively.

In this way, it can also be recognized from the graphs that the range of viewing angles in which half of the total luminous flux of reflection within the plane of incidence is obtained in the case ($\theta_{x-z}$) of a direction parallel to the x-z plane is narrower than that in the case ($\theta_{y-z}$) of a direction parallel to the y-z plane. If the value of K is smaller than 0.5, the cross-hatching area shown in FIGS. 7 and 8 becomes smaller, whereas if bigger, it is larger.

Figure 9:
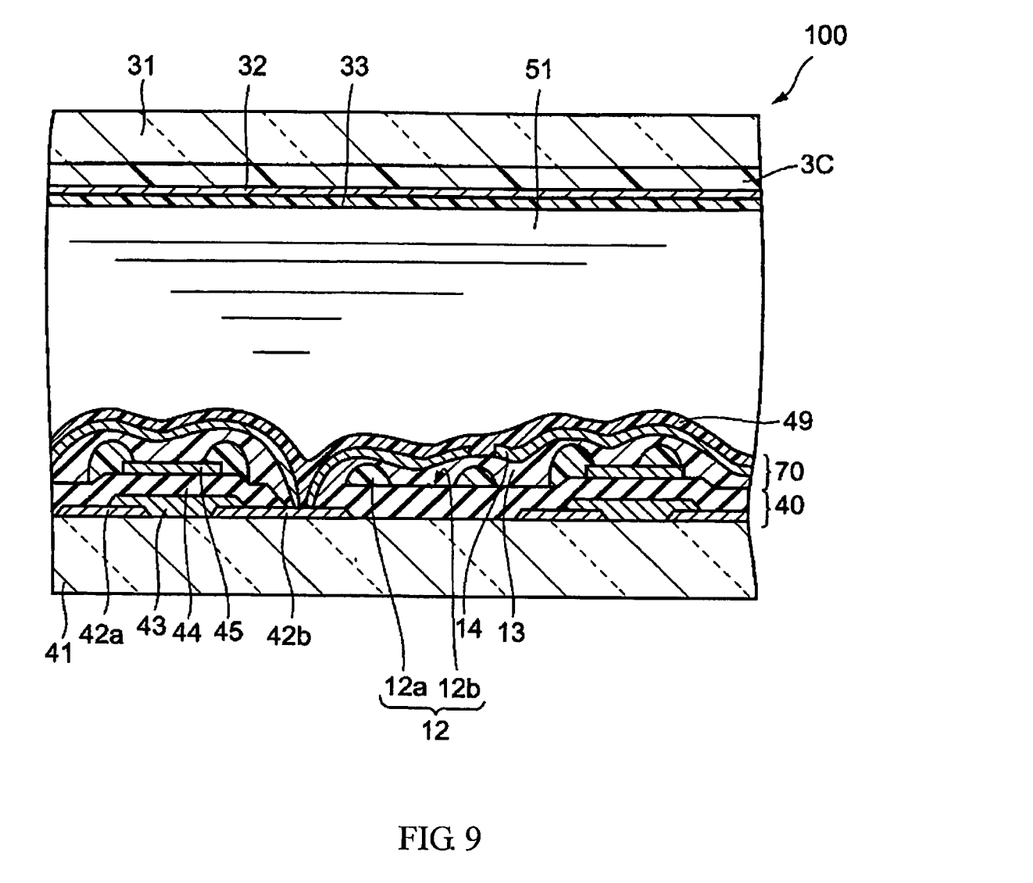
FIG. 9 is a sectional view showing a general structure of a liquid crystal display device of an embodiment according to the present invention.

FIG. 9 shows a general sectional structure of a reflective liquid crystal display device constructed using the diffusive reflecting layer 70 having such characteristics.

The liquid crystal display device 100 in this example adopts an active matrix system using thin-film transistors (TFTs) as pixel driving elements, but the present invention is not necessarily limited to this.

The liquid crystal display device 100 comprises, as members that sandwich the liquid crystal medium, a front substrate 31 disposed on the side of incidence of external light and a rear substrate 41 disposed facing the front substrate 31 with a predetermined gap in between. The gap between the front substrate 31 and the rear substrate 41 is filled with a liquid crystal layer 51 using a sealing member (not shown). The liquid crystal layer 51 serves as an electro-optic medium for performing optical modulation in accordance with the image to be displayed.

The front substrate 31 is a transparent substrate made of for example, glass and is provided on its inner side with a color filter 3C, a common electrode 32 consisting of a transparent conductor such as ITO (indium tin oxide) and an orientation film 33 which defines initial orientation on the top side of the liquid crystal layer 51, in this order.

The rear substrate 41 is provided on inner side with a TFT-composite layer 40 in which pixel driving TFTs are formed, the above-described diffusive reflecting layer 70 and an orientation film 49 which defines initial orientation on the bottom side of the liquid crystal layer 51, in this order.

In the TFT-composite layer 40, a source electrode 42a and a drain electrode 42b are formed away from each other and a semiconductor layer 43 is formed between the source electrode 42a and drain electrode 42b for coupling one with another at their respective ends. On the semiconductor layer 43, a gate electrode 45 is formed through a gate insulating film 44 having an opening for connection of the drain electrode. The TFT having such a structure is formed for each of all pixels.

On the TFT-composite layer 40, the above-described diffusive reflecting layer 70 is formed. More specifically, the projections and depressions layer 12 having the above-described resist film 12a and depression portion 12b is provided over the gate insulating film 44, gate electrode 45 and drain electrode 42b, and on this projections and depressions layer, the above-described projections and depressions adjusting layer 13 having an opening for connection of pixel electrodes is provided. On the projections and depressions adjusting layer 13 and its opening, the above-described reflecting film 14 is formed. This reflecting film 14 also functions as a so-called pixel electrode and is formed of a material having not only a light reflecting property but also conductivity.

Furthermore, the reflecting film 14 is connected to the drain electrode 42b through the openings provided in the projections and depressions adjusting layer 13 and the gate insulating film 44 and extends over the most area of each given pixel. On the reflecting film 14, an orientation film 49 is formed over the entire area of the principal plane of the substrate.

The basic operation of the liquid crystal display device in such a configuration is described in the above-mentioned Patent Document 1 or more, and so explanations thereof will be omitted here.

Next, combination architecture of the liquid crystal layer 51 and the diffusive reflecting layer 70, which is one of the important features of the present invention will be described.

Figure 10:
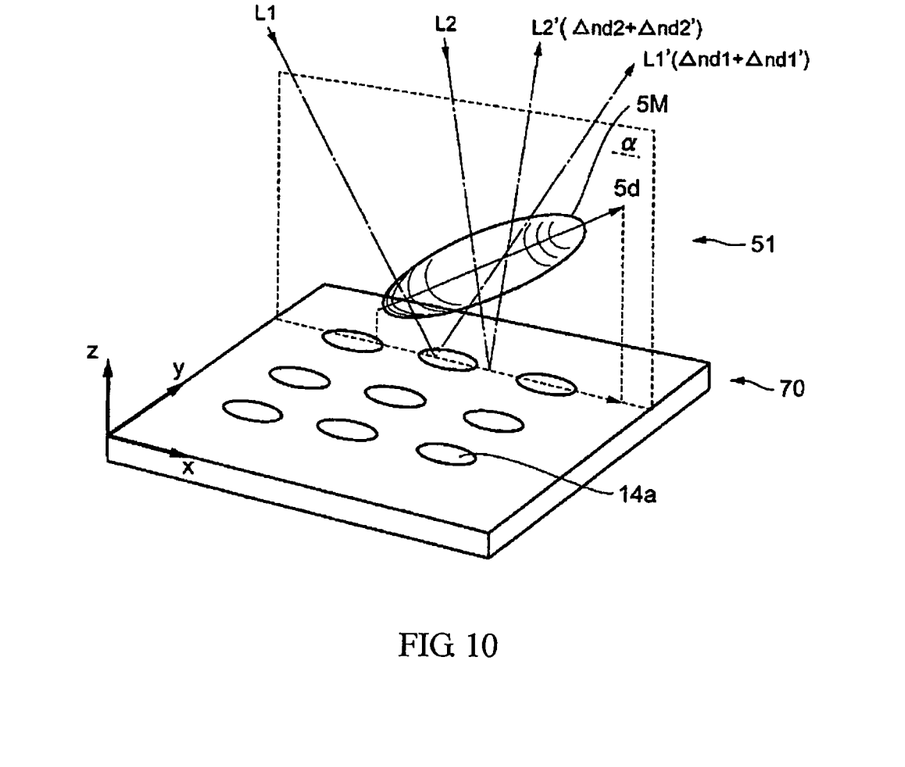
FIG. 10 is a schematic perspective view for describing a combinational manner of a liquid crystal layer and a diffusive reflecting layer in the liquid crystal display device of FIG. 9.

FIG. 10 is a schematic view in which the liquid crystal layer 51 and the diffusive reflecting layer 70 are made a model, wherein one liquid crystal molecule 5M which exists above the diffusive reflecting layer 70 is representatively shown as a micro model of the liquid crystal layer 51.

As is apparent from FIGS. 5 to 8, the diffusive reflecting layer 70 has the following requirements for a diffused reflected light distribution:

(1) a range of viewing angles $\theta_{x-z}$ within which reflected light rays of luminous flux of predetermined proportion (K) of the total luminous flux of reflection are obtained is defined, the total luminous flux of reflection being obtained in a specific plane (x-z plane) including an imaginary axis of a specific direction (x) along a principal plane (x-y plane) of the diffusive reflecting layer 70 and the normal (z-direction) to the principal plane by incident light in a direction parallel to the normal, the range of viewing angles $\theta_{x-z}$ having the direction (0°) of the incident light as a reference angle; and (2) a range of viewing angles $\theta_{y-z}$ within which reflected light rays of luminous flux of the predetermined proportion (K) of the total luminous flux of reflection are obtained is defined, the total luminous flux being obtained by the incident light in the other plane (an imaginary plane deviated substantially from the x-z plane, e.g. the y-z plane) including an imaginary axis of the other direction (directions away from the x-direction, for example, y-direction) along the principal plane of the diffusive reflecting layer 70 and the normal (z-direction) to the principal plane, the range of viewing angles $\theta_{y-z}$ having the direction (0°) of the incident light as a reference angle.

In addition to them, (3) is characterized in that the above-mentioned range of viewing angles $\theta_{x-z}$ is narrower than the range of viewing angles $\theta_{y-z}$.

Furthermore, in such a case, the present invention specifies the optimum conditions for the liquid crystal layer 51 which is advantageous for improving a quality of displaying.

According to such a specification, a plane (initial average orientation imaginary plane) α including a typical director 5d of liquid crystal molecules 5M in a dark or bright state of the liquid crystal layer and the normal (imaginary line in the z-direction) to the principal plane of the diffusive reflecting layer 70 is oriented substantially in a direction of the specific plane (x-z plane) of the above-described diffusive reflecting layer, that is, substantially parallel to the specific plane.

More specifically, the direction of the initial average orientation imaginary plane a is aligned with the direction of the specific plane of the diffusive reflecting layer based on the orientation direction of the orientation films 33 and 49 which contact to the liquid crystal layer 51 at the top and bottom. For example, if the liquid crystal layer 51 is of a homogeneous orientation type, it is only required to designate the rubbing direction of the upper and lower orientation films 33 and 49 as the x-direction. When the liquid crystal layer 51 is of a twisted orientation type, the rubbing direction of the upper and lower orientation films 33 and 49 is determined in such a manner that the plane including the director of liquid crystal molecules of the center portion of the liquid crystal layer 51 and the normal to the principal plane of the diffusive reflecting layer 70 is parallel to the specific plane (x-z plane), where the director of liquid crystal molecules of the center portion of the liquid crystal layer 51 is regarded as "average director".

Even if the liquid crystal layer 51 is of any orientation type other than these types, the "average director" of the liquid crystal molecules may be specified or estimated when the liquid crystal layer is in a dark or bright state to make a setting so that the initial average orientation imaginary plane of the resultant director is substantially parallel to the specific plane of the diffusive reflecting layer.

It goes without saying that it is also possible to use other methods for defining an initial orientation such as an oblique evaporation method and optical orientation method instead of the rubbing treatment.

The characteristic of the diffusive reflecting layer 70 providing a narrow range of viewing angles within which reflection of at least the predetermined intensity of the reflected light is caused on the x-z plane means that incident light in the x-z plane or a plane close thereto is easily made to be directly reflected and easily reflected in the x-z plane likewise. This can be intuitively understood from a phenomenon that light incident on the liquid crystal layer 51 in a substantially frontal direction of the screen is generally reflected with a directionality close to the frontal direction. Therefore, as shown in FIG. 7, light L1 incident in the x-z plane passes through the liquid crystal layer 51 at any angle and reaches the surface of the diffusive reflecting layer 70, while it is considered to be reflected as reflected light L1' within the same plane, pass through the liquid crystal layer 51 again and be directed to the front of the display device 100.

According to the present invention, the following effects can be expected by placing the x-z plane of the diffusive reflecting layer 70 from which such behavior of light can be expected parallel to the specific plane a of the liquid crystal layer 51.

That is, the total sum ret1 of a retardation Δnd1 and a retardation Δnd1' has a certain value, where the incident light L1 having a certain angle of incidence undergoes the retardation Δnd1 from the liquid crystal layer 51 (liquid crystal molecule 5M) until it reaches the diffusive reflecting layer 70 and the reflected light L1' therefrom undergoes the retardation Δnd1' from the liquid crystal layer 51, in the plane of incidence parallel to the x-z plane. Furthermore, the total sum ret2 of a retardation Δnd2 and a retardation Δnd2' also has a certain value, where the incident light L2 having a different angle of incidence within the same plane of incidence undergoes the retardation Δnd2 from the liquid crystal layer 51 (liquid crystal molecule 5M) until it reaches the diffusive reflecting layer 70 and the reflected light L2' therefrom undergoes the retardation Δnd2' from the liquid crystal layer 51 in the same plane of incidence, resulting generally in ret1=ret2 is held. This is attributable to a phenomenon in which the total sum of birefringence of the liquid crystal molecules 5M that affects the incident light and birefringence that affects the reflected light does not change as long as the light follows the optical path of direct reflection even if the liquid crystal molecule 5M is inclined as shown in the figure and even if the light has any angle of incidence. This phenomenon is called "retardation self-compensation effect".

Therefore, the reflected light within this x-z plane is subjected t to substantially the same retardation even if the viewing angle changes within the x-z plane, and so the dependence of contrast on the viewing angle within the plane is preferably low.

On the other hand, the incident light at any angle within the y-z plane enters in a direction perpendicular to the average director, but it is diffusively reflected at the diffusive reflecting layer 70, and the optical path thereof is indeterminate. However, in this case, retardation of the liquid crystal changes asymmetrically with respect to, e.g. the front view direction and a variation of retardation with respect to the variation of the viewing angle is small. As a result, the dependence of contrast on the viewing angle within the y-z plane as a whole remains stable as before.

Unlike the above description, if the x-z plane of the diffusive reflecting layer 70 and the specific plane at of the liquid crystal layer 51 are different in direction, the above-described self-compensation effect cannot be expected. That is, the total sum of retardation influencing the reflected light in the x-z plane which behaves like direct reflection varies depending on the angle of reflection and the contrast changes according to the viewing angle within the plane. If the mismatch of direction is considerably large, there is a possibility that the whole area of the display face may turn black even with a tiny variation of the viewing angle, that is, the so-called black crush may occur.

It may be preferable that the x-direction and y-direction in the above-described embodiment are set to the vertical direction and horizontal direction of a display face of the liquid crystal display device respectively when the display face is viewed from the front. This is because reflective type liquid crystal display devices used in portable information terminal etc. is seldom in a mode of the display screen being viewed from the front by changing its angle vertically, while it is often in a mode of the screen being viewed by changing its angle horizontally. This leads to effective use of light at viewing angles in the horizontal direction and the above-described self-compensation effect also makes it possible to keep the contrast satisfactorily even at the vertical viewing angle, to thereby considerably improve the quality of displaying in practical use. However, it goes without saying that the x-direction and y-direction may also be set as appropriate for other applications and purposes.

In order to implement the present invention effectively, it is desirable to make a large difference to some extent between the above-described range of viewing angles $\theta_{x-z}$ and the above-described range of viewing angles $\theta_{y-z}$. Furthermore, basically the above-described proportion K preferably has such a value that minimizes the range of viewing angles that satisfies the above-described certain requirements on the specific plane (x-z plane) with less diffusiveness is set as small as possible, but reducing K excessively will cause mirror reflection in the specific plane direction, and so it is preferable to select a compromise between them.

The present invention has been explained so far, but the present invention is not limited to the above-described embodiments and can be modified in various ways.

For example, the x-direction and y-direction are perpendicular to each other, but they need not always be perpendicular to each other.

Furthermore, the present invention has been described with reference to a diffusive reflecting layer in which both the range of viewing angles $\theta_{y-z}$ and the range of viewing angles $\theta_{y-z}$ are specified to a desired specification, but the present invention is applicable to any cases where only a range of viewing angles having the aforementioned requirements within the specific plane including the imaginary axis in the specific direction along the principal plane of the diffusive reflecting layer and the normal to the principal plane is defined to a desired specification and this range of viewing angles can be recognized to be narrower than a range of viewing angles within the other plane including the imaginary axis in the other direction along the principal plane of the diffusive reflecting layer and the normal to the principal plane.

Furthermore, the above-described embodiment has taken specific examples of the configuration of the diffusive reflecting layer and its manufacturing method, but the present invention is not limited to these examples. However, these examples are preferable in the sense that it is possible to form the diffusive reflecting layer having a diffused reflected light distribution with a desired directivity simply and in sophistication In addition, the above-described embodiment has been described about the active matrix type reflective liquid crystal display device, but the present invention is also applicable to a transflective or passive type. Furthermore, the above example shows a so-called top-gate type TFT, but it goes without saying that a bottom-gate type TFT described in the above-mentioned Patent Document 1 is also acceptable.

EXPLANATION OF SYMBOLS

11 . . . support member
12a . . . resist film
12b . . . depression portion
12 . . . projections and depressions layer
13 . . . projections and depressions adjusting layer
14 . . . reflecting film
70 . . . diffusive reflecting layer
21, 22 mask
21a, 22a . . . opening
31 . . . front substrate
3C . . . color filter
32 . . . common electrode
orientation film
41 . . . rear substrate
42a . . . source electrode
42b . . . drain electrode
43 . . . semiconductor layer
44 . . . gate insulating film
45 . . . gate electrode
40 . . . TFT-composite layer
51 . . . liquid crystal layer

The invention claimed is:

1. A liquid crystal display device comprising:
a liquid crystal layer for performing optical modulation in accordance with an image to be displayed; and
a diffusive reflecting layer for diffusively reflecting light having passed through the liquid crystal layer to the liquid crystal layer with a diffused reflected light distribution having a predetermined directivity, wherein
the diffusive reflecting layer has a function of giving the reflected light a diffused reflected light distribution in which: a first range of viewing angles within which reflected light rays of luminous flux of predetermined proportion of a first total luminous flux of reflection are obtained is defined, the first total luminous flux being obtained in a specific plane including a specific direction along a principal plane of the diffusive reflecting layer and the normal to the principal plane by incident light in a direction parallel to the normal, the first range of viewing angles having the direction of the incident light as a reference angle; a second range of viewing angles within which reflected light rays of luminous flux of the predetermined proportion of a second total luminous flux of reflection are obtained is defined, the second total luminous flux being obtained by the incident light in the other plane including the other direction along the principal plane of the diffusive reflecting layer and the normal to the principal plane, the second range of viewing angles having the direction of the incident light as a reference angle; and the first range is narrower than the second range, an initial average orientation imaginary plane of the liquid crystal layer, including a typical director of liquid crystal molecules in a dark or bright state and the normal to the principal plane of the diffusive reflecting layer; is substantially parallel to the specific plane, wherein the diffusive reflecting layer has a reflecting surface showing roughness of shape based on a plurality of island-shaped outline units of depression or projection portions, and an average diameter of the units of depression or projection portions in the specific direction is greater than an average diameter in a direction substantially perpendicular to the specific direction on the principal plane of the diffusive reflecting layer, and an average pitch of the units of depression portions or the units of projection portions in the specific direction is greater than an average pitch of them in a direction substantially perpendicular to the specific direction on the principal plane of the diffusive reflecting layer.

2. A liquid crystal display device as defined in claim 1, characterized by an orientation film for determining such an initial molecular orientation of the liquid crystal layer that the initial average orientation imaginary plane is set to be substantially parallel to the specific plane.

3. A liquid crystal display device as defined in claim 1 or 2, characterized in that the specific direction and the other direction have substantially a perpendicular relations.

4. A liquid crystal display device as defined in claim 1 or 2, characterized in that the specific direction is a vertical direction of a display face of the liquid crystal display device, and the other direction is a horizontal direction of the display face.

5. A method of manufacturing a liquid crystal display device comprising a liquid crystal layer for performing optical modulation in accordance with an image to be displayed and a diffusive reflecting layer for diffusively reflecting light having passed through the liquid crystal layer to the liquid crystal layer with a diffused reflected light distribution having a predetermined directivity, comprising the steps of: forming the diffusive reflecting layer in such a form that the diffusive reflecting layer has a function of giving the reflected light a diffused reflected light distribution in which: a first range of viewing angles within which reflected light rays of luminous flux of predetermined proportion of the total luminous flux of reflection are obtained is defined, the total luminous flux being obtained in a specific plane including a specific direction along a principal plane of the diffusive reflecting layer and the normal to the principal plane by incident light in a direction parallel to the normal, the first range of viewing angles having the direction of the incident light as a reference angle; a second range of viewing angles within which reflected light rays of luminous flux of the predetermined proportion of the total luminous flux of reflection are obtained is defined, the total luminous flux being obtained by the incident light in the other plane including the other direction along the principal plane of the diffusive reflecting layer and the normal to the principal plane, the second range of viewing angles having the direction of the incident light as a reference angle; and the first range is narrower than the second range, forming an orientation film for determining an initial molecular orientation of the liquid crystal layer, in such a manner that an initial average orientation imaginary plane of the liquid crystal layer, including a typical director of liquid crystal molecules in a dark or bright state and the normal to the principal plane of the diffusive reflecting layer, is substantially parallel to the specific plane, wherein the diffusive reflecting layer has a reflecting surface showing roughness of shape based on a plurality of island-shaped outline units of depression or projection portions, and an average diameter of the units of depression or projection portions in the specific direction is greater than an average diameter in a direction substantially perpendicular to the specific direction on the principal plane of the diffusive reflecting layer, and an average pitch of the units of depression portions or the units of projection portions in the specific direction is greater than an average pitch of them in a direction substantially perpendicular to the specific direction on the principal plane of the diffusive reflecting layer.

* * * * *